(12) United States Patent
Kijima et al.

(10) Patent No.: US 7,045,006 B2
(45) Date of Patent: May 16, 2006

(54) CERAMIC COATING MATERIAL AND METHOD OF MANUFACTURING THE SAME

(75) Inventors: Takeshi Kijima, Matsumoto (JP); Eiji Natori, Chimo (JP)

(73) Assignee: Seiko Epson Corporation, Tokyo (JP)

( * ) Notice: Subject to any disclaimer, the term of this patent is extended or adjusted under 35 U.S.C. 154(b) by 48 days.

(21) Appl. No.: 10/808,349

(22) Filed: Mar. 25, 2004

(65) Prior Publication Data

US 2004/0248997 A1   Dec. 9, 2004

(30) Foreign Application Priority Data

Mar. 28, 2003   (JP) .............................. 2003-091717

(51) Int. Cl.
  *C04B 35/624*   (2006.01)
  *C04B 35/49*   (2006.01)
  *C04B 35/491*   (2006.01)
  *C04B 35/493*   (2006.01)
  *C04B 35/468*   (2006.01)
  *C04B 35/47*   (2006.01)

(52) U.S. Cl. .............................. 106/287.18; 106/286.2; 106/287.19; 501/1; 501/134; 501/136; 501/154

(58) Field of Classification Search ............. 106/286.2, 106/287.18, 287.19; 501/1, 134, 136, 154, 501/12

See application file for complete search history.

(56) References Cited

U.S. PATENT DOCUMENTS

| | | | |
|---|---|---|---|
| 5,008,320 A * | 4/1991 | Haluska et al. ............. | 524/361 |
| 6,344,242 B1 * | 2/2002 | Stolk et al. ................. | 427/301 |
| 6,860,933 B1 * | 3/2005 | Lobmann et al. ...... | 106/287.16 |

* cited by examiner

Primary Examiner—David Brunsman
(74) Attorney, Agent, or Firm—Oliff & Berridge PLC

(57) ABSTRACT

A method of manufacturing a ceramic coating material which includes stirring a material including a complex oxide in the presence of a catalyst containing platinum group elements. The material is a sol-gel material which includes at least one of a hydrolysate and a polycondensate of the complex oxide.

6 Claims, 3 Drawing Sheets

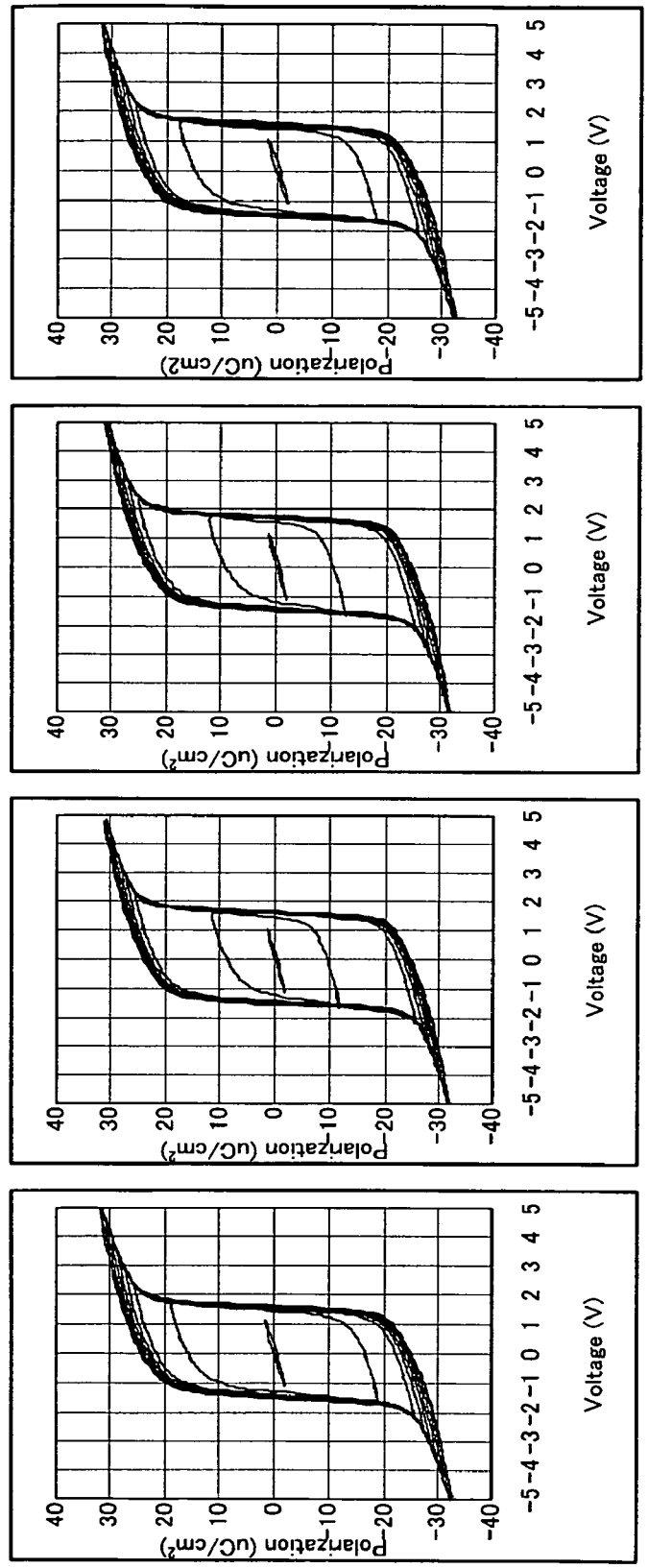

CERAMIC COATING MATERIAL AND METHOD OF MANUFACTURING THE SAME

Japanese Patent Application No. 2003-91717, filed on Mar. 28, 2003, is hereby incorporated by reference in its entirety.

BACKGROUND OF THE INVENTION

The present invention relates to a ceramic coating material and a method of manufacturing the ceramic coating material.

As a ferroelectric film applied to semiconductor devices {ferroelectric memory (FeRAM), for example}, a ferroelectric film having a perovskite structure (PbZrTiO, for example) and a ferroelectric film having a layered perovskite structure (BiLaTiO, BiTiO, or SrBiTaO, for example) have been proposed.

As a method of forming such a ferroelectric film, a coating method using a sol-gel material or an MOD material has been known. The coating method has advantages in that the composition of the film is easily controlled and particles are not produced in comparison with a sputtering method.

BRIEF SUMMARY OF THE INVENTION

The present invention may provide a ceramic coating material and a method of manufacturing the ceramic coating material capable of forming a ceramic film having excellent film characteristics.

According to one aspect of the present invention, there is provided a method of manufacturing a ceramic coating material, comprising: stirring a material including a complex oxide in the presence of a catalyst containing platinum group elements.

A ceramic material capable of forming a ceramic film having excellent film characteristics can be manufactured by stirring the materials in the presence of the catalyst containing platinum group elements.

In this method of manufacturing a ceramic coating material, the material may be a sol-gel material which includes at least one of a hydrolysate and a polycondensate of the complex oxide. The sol-gel material may include an MOD material, if necessary.

In this method of manufacturing a ceramic coating material, the material may include a paraelectric material having a catalytic effect on the complex oxide, in addition to the complex oxide. The paraelectric material may be an oxide which includes silicon (Si) or germanium (Ge), or an oxide which includes Si and Ge.

According to another aspect of the present invention, there is provided a ceramic coating material manufactured by the above method of manufacturing a ceramic coating material.

BRIEF DESCRIPTION OF THE SEVERAL VIEWS OF THE DRAWING

FIGS. 3A to 3D are graphs showing hysteresis characteristics of PZT films formed from a ceramic coating material sample according to one embodiment of the present invention.

DETAILED DESCRIPTION OF THE EMBODIMENT

An embodiment of the present invention will be described below.

Figure 1:
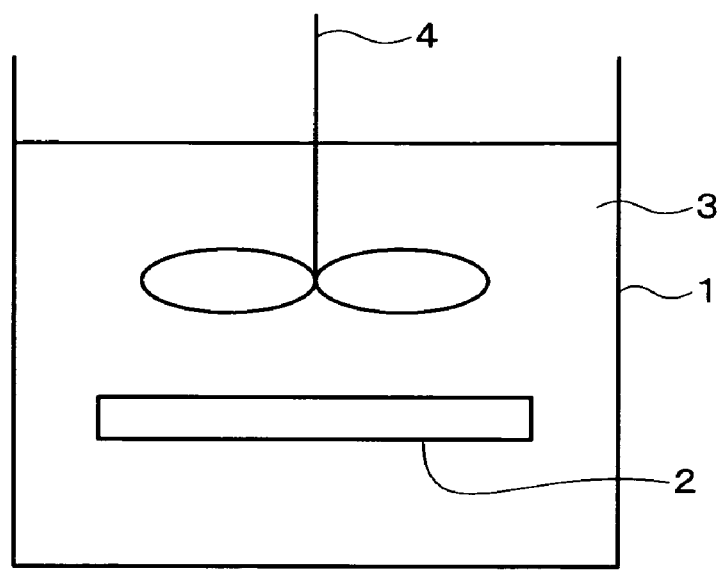
FIG. 1 is a diagram schematically showing a manufacturing method according to one embodiment of the present invention.

According to one embodiment of the present invention, there is provided a method of manufacturing a ceramic coating material, comprising: stirring a material including a complex oxide in the presence of a catalyst containing platinum group elements. As shown in FIG. 1, a container 1 includes a catalyst 2 containing platinum group elements and a material 3 including a complex oxide. The material 3 is stirred by using a stirrer 4 to obtain a ceramic material. The catalyst 2 can be caused to uniformly and efficiently come into contact with the material 3 by stirring. The ceramic material prepared in this manner can form a ceramic film having excellent film characteristics as described later. Moreover, the ceramic material is stable without showing a change over time.

It is considered that an excellent ceramic material is obtained in the presence of the catalyst containing platinum group elements because an alcohol exchange reaction of the sol-gel material is promoted by the catalytic effect of the platinum element.

As examples of the catalyst containing platinum group elements, platinum, ruthenium, rhodium, palladium, osmium, and iridium can be given. The catalyst may be in the shape of a plate or mesh, granular, or the like. The catalyst may have various forms without limitations. In order to increase the contact area between the catalyst and the material, the catalyst is preferably in the shape of mesh or granular. The catalyst is removed after stirring of the material is completed.

In this embodiment, the material may be a sol-gel material which includes at least one of a hydrolysate and a polycondensate of the complex oxide. The sol-gel material may include an MOD material, if necessary.

The sol-gel material may be prepared as follows. Metal alkoxides having four or less carbon atoms are mixed and subjected to hydrolysis and polycondensation. A strong M-O-M-O . . . bond is formed by hydrolysis and polycondensation. The resulting M-O-M bond has a structure similar to the ceramic crystal structure (perovskite structure). M represents a metal element (Bi, Ti, La, or Pb, for example), and O represents oxygen. A solvent is added to the product obtained by hydrolysis and polycondensation to obtain a material. The sol-gel material is prepared in this manner.

As examples of the MOD material, a polynuclear metal complex material in which elements of the ceramic film are continuously connected either directly or indirectly can be given. As specific examples of the MOD material, a metal salt of a carboxylic acid can be given. As examples of the carboxylic acid, acetic acid, 2-ethylhexanoic acid, and the like can be given. As examples of the metal, Bi, Ti, La, Pb, and the like can be given. The MOD material has an M-O bond in the same manner as the sol-gel material. However, the M-O bond does not form a continuous bond as in the sol-gel material obtained by polycondensation. Moreover, the bond structure is similar to the linear structure and completely differs from the perovskite structure.

In the materials, the sol-gel material or the MOD material may be adjusted to the stoichiometric composition of the complex oxide, and the mixture of the materials may include the metal material (Pb or Bi, for example) included in the complex oxide in excess of the stoichiometric composition.

The material may include a paraelectric material having a catalytic effect on the complex oxide, in addition to the complex oxide. When the paraelectric material is present in the material in addition to the complex oxide which makes up the ferroelectric, part of the elements of the complex oxide is replaced by the elements of the paraelectric material during the crystallization process of the complex oxide, whereby the crystallization temperature can be reduced.

The paraelectric material may be an oxide which includes silicon (Si) or germanium (Ge), or an oxide which includes Si and Ge.

As the paraelectric material, an oxide which includes Si or Ge or an oxide which includes Si and Ge may be used, for example. As such an oxide, a paraelectric material shown by $ABO_X$ or $BO_X$ in which the A site includes a single element or a composite element of Pb, Bi, Hf, Zr, V, or W and the B site includes a single element or a composite element of Si or Ge may be used. Specific examples include PbSiO ($Pb_5Si_3O_X$ or $Pb_2Si_1O_X$), PbGeO ($Pb_5Ge_3O_X$ or $Pb_2Ge_1O_X$), BiSiO ($Bi_4Si_3O_X$ or $Bi_2Si_1O_X$), BiGeO ($Bi_4Ge_3O_X$ or $Bi_2Si_1O_X$), $ZrGeO_X$, $HfGeO_X$, $VGeO_X$, $WGeO_X$, $VSiO_X$, $WSiO_X$, and the like. In the case of using Zr, Hf, V, or W in the A site, occurrence of oxygen vacancies in the ferroelectric is prevented.

The ceramic coating material according to this embodiment is prepared by stirring the material in the presence of the catalyst containing platinum group elements, and then removing the catalyst containing platinum group elements. The obtained ceramic material is applied to a base by conventional coating methods such as spin coating and dipping.

A ceramic film such as a ferroelectric film can be obtained by subjecting the ceramic material according to this embodiment to a heat treatment using conventional methods. A ceramic film is obtained as follows, for example. At first, the ceramic material according to this embodiment is applied to a base to form a coating layer. The coating layer is dried and presintered, if necessary. The coating layer is then crystallized by subjecting the coating layer to a heat treatment to form a ceramic film.

A further detailed description of the manufacturing method according to this embodiment of the present invention is described below with reference to the drawings.

EXAMPLE

A sol-gel solution for forming a $PbZr_{0.2}Ti_{0.80}O_3$ film adjusted to the stoichiometric composition (concentration: 10 wt %) was stirred in a container in which a plate-shaped platinum was placed. The platinum plate was then removed and a ceramic material sample 1 is obtained. Another ceramic material was prepared in the same manner as the sample 1 except that platinum was not placed in the container. This ceramic material is referred to as a comparative sample 1. In this example, the amount of excess Pb in the original material was set at 20 mol %. Coating films were prepared by using the sample 1 and the comparative sample 1. The coating films were prepared by applying the sol-gel solution of the sample 1 and the comparative sample 1 to platinum electrodes by spin coating. The spin coating was performed at 3,000 rpm for 30 seconds. The coating films were presintered by heating at 150° C. for two minutes and at 300° C. for five minutes with a hot plate. Coating layers each having a thickness of 150 nm were formed by repeating the above-described coating step and presintering step three times.

The coating films were then crystallized by using a pressure heat treatment device. The crystallization conditions were set at a pressure of 9.9 atmospheres, a heat treatment temperature of 650° C., and a treatment time of 10 minutes.

Figure 2B:
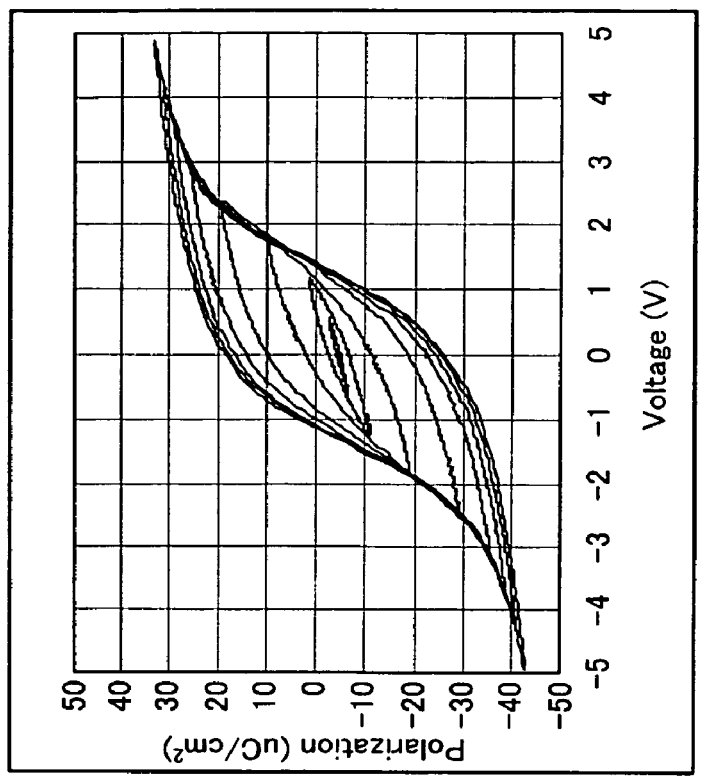
FIGS. 2A and 2B are graphs showing hysteresis characteristics of PZT films formed from a ceramic coating material sample and a comparative sample according to one embodiment of the present invention.
Figure 2A:
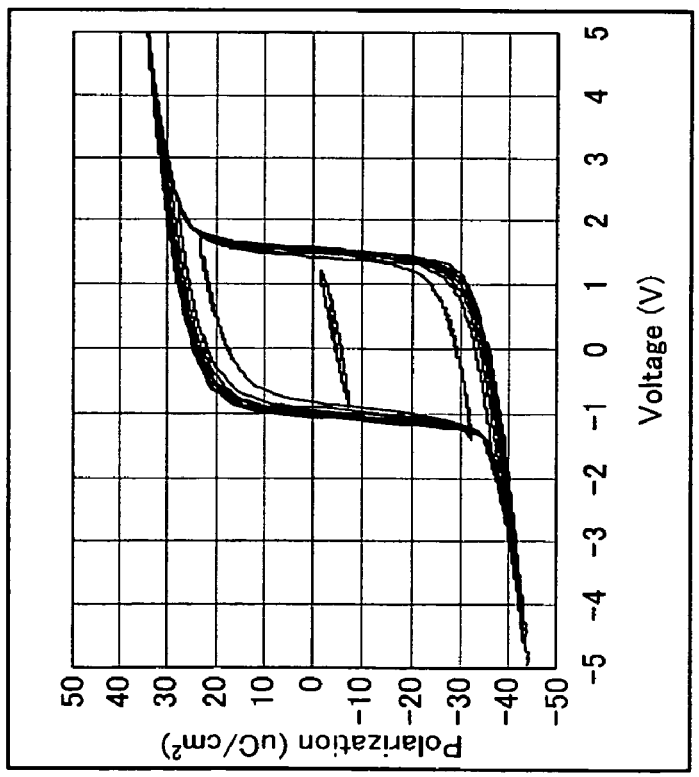

Platinum electrodes with a diameter of 100 μm and a thickness of 100 nm were formed on the coating films to obtain capacitors. Ferroelectric characteristics (hysteresis characteristics) were measured by using these capacitors. The results are shown in FIGS. 2A and 2B. FIG. 2A shows the hysteresis characteristics of the capacitor formed from the sample 1. FIG. 2B shows the hysteresis characteristics of the capacitor formed from the comparative sample 1. From these results, it was confirmed that the sample 1 shows a good hysteresis loop with excellent squareness which saturates at a low voltage in comparison with the comparative sample 1.

The following measurement was performed in order to observe the change over time of the ceramic material sample 1. Specifically, capacitor samples were formed by the same method as described above using the ceramic material left for a given period of time after preparation. The hysteresis characteristics of the capacitor samples were measured to obtain results shown in FIGS. 3A to 3D. FIG. 3A shows the hysteresis characteristics of the capacitor sample using the ceramic material immediately after the preparation. FIGS. 3B, 3C, and 3D show the hysteresis characteristics of the capacitor samples using the ceramic material after two weeks, four weeks, and six weeks after the preparation, respectively. From these results, it was confirmed that the capacitor samples using the ceramic material according to this example have good hysteresis with excellent squareness of the hysteresis loop, and that the hysteresis of the capacitor samples hardly depends on the period of time elapsed after the preparation of the ceramic material.

As described above, according to this embodiment of the present invention, a ceramic film having excellent ferroelectric characteristics can be formed by providing the catalyst containing platinum group elements when preparing the ceramic material. Moreover, a ceramic material not showing a change over time can be obtained.

What is claimed is:

1. A method of manufacturing a ceramic coating material, comprising:
   stirring a material including a complex oxide in the presence of a catalyst containing platinum group elements;
   wherein the material is a sol-gel material that includes at least one of a hydrolysate and a polycondensate of the complex oxide.

2. The method of manufacturing a ceramic coating material as defined in claim 1,
   wherein the material includes a paraelectric material having a catalytic effect on the complex oxide, in addition to the complex oxide.

3. The method of manufacturing a ceramic coating material as defined in claim 2,
   wherein the paraelectric material is an oxide which includes silicon (Si) or germanium (Ge) or an oxide which includes Si and Ge.

4. A ceramic coating material manufactured by the method of manufacturing a ceramic coating material as defined in claim 3.

5. A ceramic coating material manufactured by the method of manufacturing a ceramic coating material as defined in claim 2.

6. A ceramic coating material manufactured by the method of manufacturing a ceramic coating material as defined in claim 1.

* * * * *